UNITED STATES PATENT OFFICE.

ENGELBERT RICHTERS, OF SAARAU, GERMANY.

PROCESS OF MAKING ARTIFICIAL CRYOLITE.

SPECIFICATION forming part of Letters Patent No. 447,063, dated February 24, 1891.

Application filed November 7, 1890. Serial No. 370,670. (No specimens.) Patented in Germany September 19, 1889, No. 53,045.

*To all whom it may concern:*

Be it known that I, ENGELBERT RICHTERS, a citizen of the German Empire, residing at Saarau, in the Kingdom of Prussia and Empire of Germany, have invented certain new and useful improvements in processes for utilizing the silicic fluoride obtained by the treatment of certain phosphates with sulphuric acid for the production of artificial cryolite, (for which Letters Patent were granted to me in Germany, No. 53,045, dated September 19, 1889;) and I do declare the following to be a full, clear, and exact description of the invention, such as will enable others skilled in the art to which it appertains to make and use the same.

In the treatment of phosphates containing fluorine by means of sulphuric acid considerable quantity of silicic fluoride in gaseous form is generated, which is decomposed in part during this treatment and which combines with the water in the sulphuric acid into silicic acid and hydro-fluosilicic acid according to the following formula: $3SiF_4 + 4H_2O = 2SiF_6H_2SiO_4$. The troublesome fluorine compositions thus obtained could not be utilized in the arts.

The object of this invention is to furnish an improved process by which these fluorine combinations may be utilized for the production of a double fluoride of an alkali and aluminium, which, according to numerous tests made with it, can be used in place of natural cryolite in the manufacture of enamels and opaque or enameled glass. The gases which are generated during the treatment of the phosphates are conducted into receivers, in which they are condensed. These receivers can be made of any suitable material, such as wood, earthenware, and the like, which are not attacked by hydrofluosilicic acid. The receivers are constructed in the nature of the apparatus which are used in the condensation of hydrochloric acid, and which are known as "tourilles," or towers from wood or clay. If the gases contain, besides the hydrofluosilicic acid, silicic fluoride, which depends mainly on the concentration of the sulphuric acid used in the treatment of the phosphates, it is necessary for the decomposition of the silicic fluoride to add water, either in liquid state or in the form of steam. Otherwise the simple cooling of the gases is sufficient for condensing the hydrofluosilicic acid. The silicic acid containing hydrofluosilicic acid is collected in the receiver and treated with water, so that a solution of hydrofluosilicic acid is obtained, which is separated from the silicic acid by known means, such as decanting or by a filter-press of wood, &c. The so-obtained solution of hydrofluosilicic acid, which is preferably used in a strength of from twelve to fifteen per cent. in volume, is treated with alumina hydrate and a caustic or carbonate alkali, according to the following formula: $2SiF_6H_2Al_2(OH)_6 + 3Na_2O = Al_2F_6 6NaF + 2H_4SiO_4 + H_2O$. By the reaction a mixture of silicic acid and a double fluoride of an alkali and aluminium is obtained, which double fluoride corresponds in its composition to the natural cryolite. It is best to employ the hydrofluosilicic acid, as well as the alumina hydrate and alkali, in quantities which correspond as nearly as possible to the stoichiometric formula just stated. Small deviations from said formula may be made so as to obtain combinations in which the quantities of alumina and alkali contained therein may vary, but in all cases a double fluoride of an alkali and aluminium is the result. This is proven by the following reactions:

First. When hydrofluosilicic acid is decomposed by an alkali carbonate or caustic alkali according to the following formula, $SiF_6H_2Al_2(OH)_6 = Al_2F_6 + H_4SiO_4 + 2H_2O$, then the silicic acid is precipitated in a gelatinous mass, while the liquor contains aluminium fluoride in solution. Both can be readily recognized and determined by the well-known reactions.

Second. When hydrofluosilicic acid is decomposed by an alkali carbonate or hydrate according to the following formula, $SiF_6H_2 + 6NaHO = 6NaF + H_4SiO_4 + 2H_2O$, the silicic acid is also precipitated in a gelatinous mass, while the liquor contains an alkali fluoride, which substances can both be readily recognized and determined by the usual reactions.

Third. When both liquors (with or without the precipitated silicic acid) are mixed together, or when one-half of the hydrofluosilicic acid is first decomposed by the action of the alumina hydrate and then the alkali added, a body is obtained of which none of its aluminium fluoride or alkali fluoride, or at least only traces of the latter, are dissolved by water. Both have combined to a double combination which is insoluble in water— namely, a double fluoride of an alkali and aluminium—the composition of which can be readily ascertained from the quantities of the substances used. The product thus obtained can be used with advantage in the manufacture of opaque and enameled glass or of enamel, in which it fully replaces the natural cryolite, owing to its high percentage (nearly seventy per cent.) of artificial double fluoride of an alkali and aluminium. It is applied for use according to a series of tests made by me in the same manner as cryolite. This artificial cryolite can also be obtained free of silicic acid when the alumina and alkali are used in the form of a diluted solution of an aluminate of alkali—for instance, in one liter not more than twenty-five to thirty grams of alumina, while at the same time a small quantity of alkali carbonate is added. When this solution is decomposed with hydrofluosilicic acid, then all the silicic acid is held in solution in the diluted carbonic acid containing liquor, while the artificial cryolite is separated by a filter-press or in any other suitable manner, and obtained as a precipitate which is entirely free from silicic acid.

Having thus described my invention, I claim as new and desire to secure by Letters Patent—

1. The herein-described process of utilizing the gaseous silicic fluoride obtained in treating fluorine containing phosphates with sulphuric acid, which consists in converting said silicic fluoride by means of water into a solution of hydrofluosilicic acid and subjecting the thus-obtained solution to the action of alumina hydrate and a caustic alkali or an alkali carbonate, so that a mixture of artificial cryolite and silicic acid is obtained, substantially as set forth.

2. The herein-described process of utilizing the gaseous silicic fluoride obtained in treating fluorine containing phosphates with sulphuric acid, which consists in converting said silicic fluoride by means of water into a solution of hydrofluosilicic acid, subjecting the thus-obtained solution to the action of the alumina hydrate and a caustic alkali or an alkali carbonate, so as to form artificial cryolite and silicic acid, and then separating said cryolite by filtration from the silicic acid, substantially as set forth.

In testimony whereof I have affixed my signature in presence of two witnesses.

ENGELBERT RICHTERS.

Witnesses.
GEORG KLAMT,
MAX ODENBACH.